(12) United States Patent  (10) Patent No.: US 9,420,172 B2
Kim et al.  (45) Date of Patent: Aug. 16, 2016

(54) ELECTRONIC DEVICE FOR EDITING DUAL IMAGE AND METHOD THEREOF

(71) Applicant: Samsung Electronics Co., Ltd., Gyeonggi-do (KR)

(72) Inventors: Hyun-Kyoung Kim, Seoul (KR); Dae-Sung Kim, Seoul (KR); So-Ra Kim, Seoul (KR); Hang-Kyu Park, Seoul (KR); Seung-Kyung Lim, Seoul (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 14/294,982

(22) Filed: Jun. 3, 2014

(65) Prior Publication Data

US 2014/0354848 A1  Dec. 4, 2014

(30) Foreign Application Priority Data

Jun. 4, 2013 (KR) .................. 10-2013-0064097

(51) Int. Cl.
*H04N 5/232* (2006.01)
*H04N 5/76* (2006.01)
*H04N 1/00* (2006.01)
*H04N 1/32* (2006.01)

(52) U.S. Cl.
CPC ........ *H04N 5/23229* (2013.01); *H04N 1/00411* (2013.01); *H04N 1/00456* (2013.01); *H04N 1/00461* (2013.01); *H04N 1/00469* (2013.01); *H04N 1/32144* (2013.01); *H04N 5/23216* (2013.01); *H04N 5/23293* (2013.01); *H04N 5/76* (2013.01); *H04N 2201/325* (2013.01); *H04N 2201/3245* (2013.01); *H04N 2201/3249* (2013.01); *H04N 2201/3263* (2013.01); *H04N 2201/3271* (2013.01); *H04N 2201/3273* (2013.01)

(58) Field of Classification Search
CPC ..................... H04N 5/2258; H04N 5/23293
See application file for complete search history.

(56) References Cited

U.S. PATENT DOCUMENTS

| | | | |
|---|---|---|---|
| 8,866,943 B2* | 10/2014 | Park et al. .............. | 348/267 |
| 8,988,558 B2* | 3/2015 | Chong et al. ........... | 348/239 |
| 2003/0117501 A1* | 6/2003 | Shirakawa .............. | 348/218.1 |
| 2006/0140508 A1 | 6/2006 | Ohgishi et al. | |
| 2008/0084482 A1 | 4/2008 | Hansson et al. | |
| 2009/0175609 A1 | 7/2009 | Tan | |
| 2010/0026834 A1 | 2/2010 | Hong | |
| 2010/0053212 A1 | 3/2010 | Kang et al. | |
| 2012/0008011 A1* | 1/2012 | Garcia Manchado ..... | 348/231.2 |

(Continued)

FOREIGN PATENT DOCUMENTS

| | | |
|---|---|---|
| EP | 1 662 795 | 5/2006 |
| KR | 1020050099350 | 10/2005 |
| KR | 10-0672338 B1 | 1/2007 |

(Continued)

OTHER PUBLICATIONS

European Search Report dated Mar. 5, 2015 issued in counterpart application No. 14170366.0-1903.

*Primary Examiner* — James Hannett
(74) *Attorney, Agent, or Firm* — The Farrell Law Firm, P.C.

(57) ABSTRACT

An electronic device for editing a dual image and a method thereof are provided. The method includes storing at least one photographed front and rear images, respectively, and editing a stored dual image using at least the one stored front and rear images.

22 Claims, 11 Drawing Sheets

(56) References Cited

U.S. PATENT DOCUMENTS

2012/0249584 A1    10/2012    Naruse  
2012/0274808 A1*    11/2012    Chong et al. ................. 348/234  
2014/0354759 A1*    12/2014    Cranfill et al. ............... 348/14.1

FOREIGN PATENT DOCUMENTS

KR    1020070117284    12/2007  
KR    1020080043492    5/2008  
KR    1020120118583    10/2012

\* cited by examiner

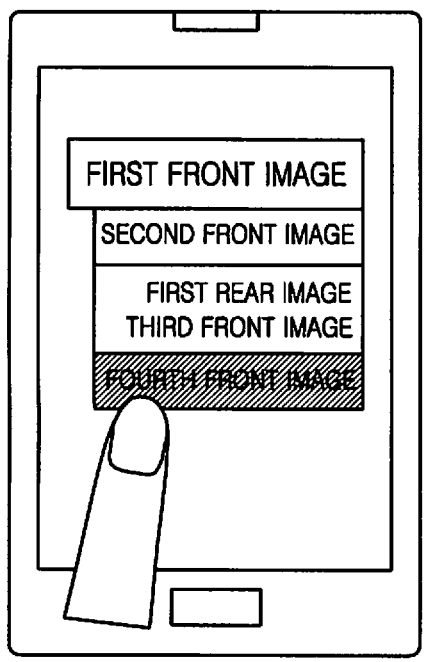 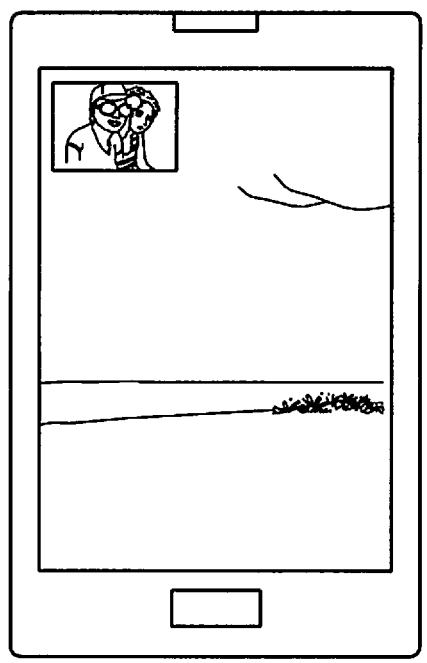
FIG.4A          FIG.4B
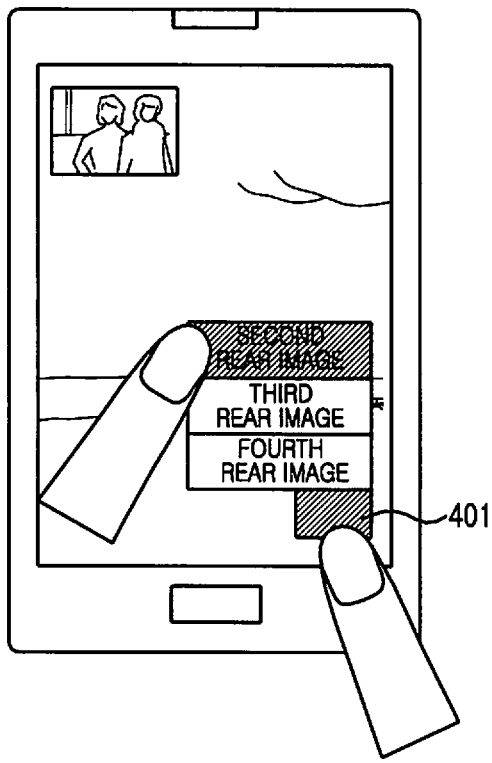 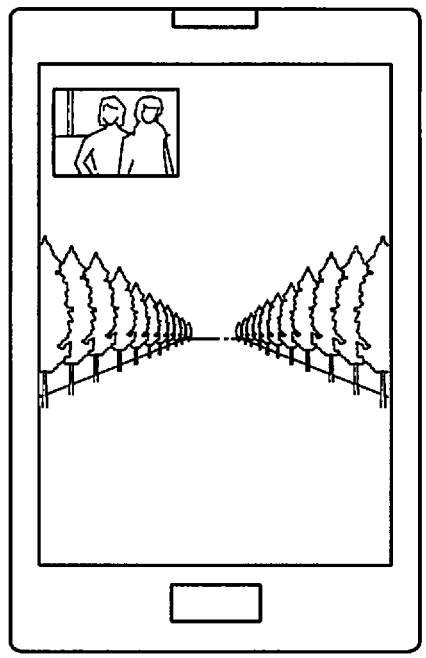
FIG.4C          FIG.4D

ELECTRONIC DEVICE FOR EDITING DUAL IMAGE AND METHOD THEREOF

PRIORITY

This application claims priority under 35 U.S.C. §119(a) to a Korean Patent Application filed in the Korean Intellectual Property Office on Jun. 4, 2013 and assigned Serial No. 10-2013-0064097, the entire disclosure of which is incorporated herein by reference.

BACKGROUND OF THE INVENTION

1. Field of the Invention

The present invention generally relates to an electronic device for editing a dual image and a method thereof.

2. Description of the Related Art

As functions of electronic devices have been developed, electronic devices having a dual camera function may photograph objects facing their front and rear surfaces simultaneously. Because these electronic devices having the dual camera function may photograph the objects facing their front and rear surfaces simultaneously, they fulfill various needs of users.

However, there is an inconvenience in that a conventional electronic device having a dual camera function may not edit a dual image which is previously stored according to preference of a user thereof by not storing just a front image or a rear image, and storing only a dual image.

Accordingly, a need exists to develop an electronic device for separately storing a front image and a rear image and generating various dual images according to the preference of the user instead of storing only a dual image.

SUMMARY OF THE INVENTION

An aspect of the present invention is to solve at least the above-mentioned problems and/or disadvantages and to provide at least the advantages described below. Accordingly, an aspect of the present invention is to provide an apparatus and method for generating various dual images instead of a uniform dual image according to preference of the user using a front image and a rear image which are stored.

In accordance with an aspect of the present invention, an operation method of an electronic device having a dual camera is provided. The operation method includes storing at least one photographed front and rear images, and editing a stored dual image using at least the one stored front and rear images.

In accordance with another aspect of the present invention, an electronic device having a dual camera is provided. The electronic device includes a memory for storing at least one photographed front and rear images, and a processor module for editing a stored dual image using at least the one stored front and rear images.

BRIEF DESCRIPTION OF THE DRAWINGS

The above and other aspects, features and advantages of certain embodiments of the present invention will be more apparent from the following detailed description taken in conjunction with the accompanying drawings, in which:

FIGS. 4A to 4D illustrate screenshots of a process of generating a dual image by replacing a front image or a rear image according to an embodiment of the present invention;

DETAILED DESCRIPTION OF EMBODIMENTS OF THE PRESENT INVENTION

Embodiments of the present invention will be described herein below with reference to the accompanying drawings. In the following description, well-known functions or constructions are not described in detail since they would obscure the invention in unnecessary detail.

Figure 1:
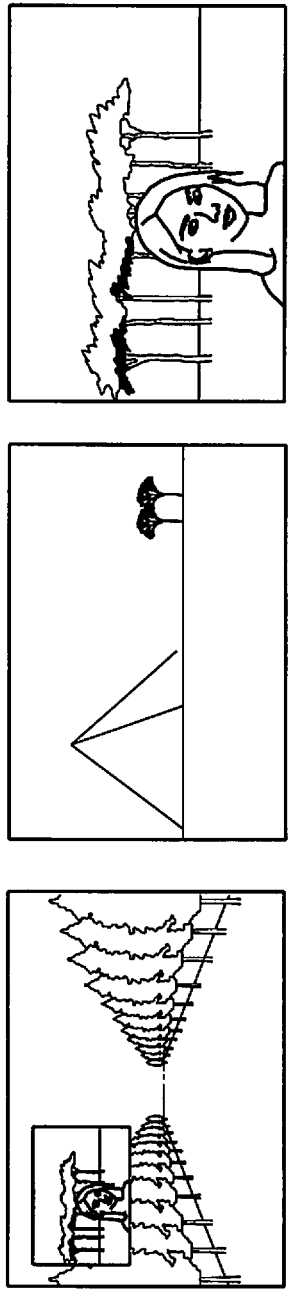
FIG. 1 illustrates an overall electronic device for editing a dual image according to an embodiment of the present invention.

FIG. 1 illustrates an overall electronic device for editing a dual image according to one embodiment of the present invention.

It is noted that the electronic device according to an embodiment of the present invention is an electronic device having a dual camera function. In more detail, the electronic device is an electronic device which may photograph an object of its front surface and an object facing its rear surface simultaneously or photograph the object facing the front surface and the object facing the rear surface successively within a set time. Herein, the electronic device may photograph the object facing the front surface and the object facing the rear surface simultaneously, as well as successively within a set time.

As shown in FIG. 1, the electronic device may generate a dual image in which the photographed object facing the front surface is located on a set space or area of the photographed object facing the rear surface. Also, the electronic device according to an embodiment of the present invention may store an original image of the front surface and an original image of the rear surface, respectively. For example, as shown in FIG. 1A, it is assumed that the object which is located facing the front surface of the electronic device is a person with the beach in the background and FIG. 1B, the object which is located facing the rear surface of the electronic device has the beach in the background.

As described above, the electronic device may photograph the object facing the front surface and the object facing the rear surface simultaneously or photograph them successively within a set time. In more detail, the electronic device may photograph a person with the beach in the background which is located facing the front surface and the beach which is located facing the rear surface simultaneously. Also, the electronic device may photograph the object facing the front surface or the rear surface, and then photograph the other object facing the other surface within a set time.

Thereafter, as shown in FIG. 1C, the electronic device may generate a dual image in which a photographed front image is located on a set space or area of a photographed rear image. The dual image according to an embodiment of the present invention is described in that the photographed front image is located on the set space of the photographed rear image. It is obvious that the electronic device may generate a dual image in which the photographed rear image is located on a set space of the photographed front image.

After generating the dual image in which the photographed front image is located on the set space of the photographed rear image, the electronic device may store a generated front image and a generated rear image, respectively. For example, the electronic device may generate the dual image by locating the front image of the person with the beach in the background on the set space of the rear image with the beach in the background. Also, the electronic device may store the rear image with the beach in the background and the front image of the person with the beach in the background, respectively.

Thereafter, the electronic device may edit a stored dual image using the stored front and rear images.

Hereinafter, a description will be given for an example of editing the stored dual image using the stored front and rear images.

First, the electronic device may change a style of the dual image to various styles without limiting a style of the stored dual image. For example, it is assumed that the electronic device receives an instruction for instructing it to change a style of a front image on a displayed dual image. In this case the electronic device displays at least one set style type which may change the style of the front image on a set space of the dual image, receives the selection of any one of at least one displayed set style type, and changes the style of the front image to the selected style.

Also, the electronic device may change a position of a frame of the front image. For example, it is assumed that the electronic device receives an instruction for instructing it to change the position of the frame of the front image on the displayed dual image. In this case the electronic device receives touch input of the front image, verifies that the touch input image of the front image is dragged to a specific space, and verifies that the front image is moved to the dragged specific space. Also, the electronic device verifies touch input of a set portion of the front image moved to the specific space, determines a direction in which the touch input front image is dragged, and verifies that the front image is scaled up or down.

Also, the electronic device may generate a new dual image by replacing only a certain background of a rear or front surface. For example, it is assumed that the electronic device reads and displays a stored first dual image and verifies a touch input of a set space of a first front image included in the displayed first dual image. In this case, the electronic device displays at least one stored front image on the set space. Thereafter, when a second front image which is any one of at least the one displayed front image, is selected, the electronic device generates a second dual image by changing the first front image included in the first dual image to the selected second front image.

Also, it is assumed that the electronic device reads and displays a stored first dual image and verifies a touch input of a set space of a first rear image included in the displayed first dual image. In this case, the electronic device displays at least one stored rear image on the set space. Thereafter, when a second rear image, which is any one of at least the one displayed rear image, is selected, the electronic device generates a second dual image by changing the first rear image included in the first dual image to the selected second rear image.

Also, the electronic device may remove only a certain background of a front image included in a stored dual image. For example, it is assumed that the electronic device receives an instruction for instructing it to delete a background of a front image included in a displayed dual image. In this case, the electronic device generates a dual image including a front image from which the background is deleted on the front image. In more detail, when an instruction for instructing the electronic device to edit the front image from which the background is deleted is an instruction for instructing the electronic device to restore a specific portion on the front image from which the background is deleted, the electronic device may receive touch input of a first external portion on the front image from which the background is deleted, verify that the touch input first external portion is dragged to a second external portion, and restore the front image from which the background is deleted to a dragged and partitioned space.

Also, when the instruction for instructing the electronic device to edit the front image from which the background image is deleted is an instruction for instructing the electronic device to delete a specific portion on the front image from which the background is deleted, the electronic device may receive touch input of a first external portion on the front image from which the background is deleted, verify that the touch input first external portion is dragged to a second external portion, and delete a dragged and partitioned space from the front image from which the background is deleted.

In a conventional electronic device, there is an inconvenience in having a dual camera function which may not edit a dual image which is previously stored according to preferences of a user thereof by not storing a front image and a rear image, and storing only a dual image.

However, in the electronic device according to an embodiment of the present invention there is an advantage which improves convenience of a user thereof by storing a front image and a rear image, respectively as well as a dual image and generating dual images of a number of infinite cases.

Figure 2A:
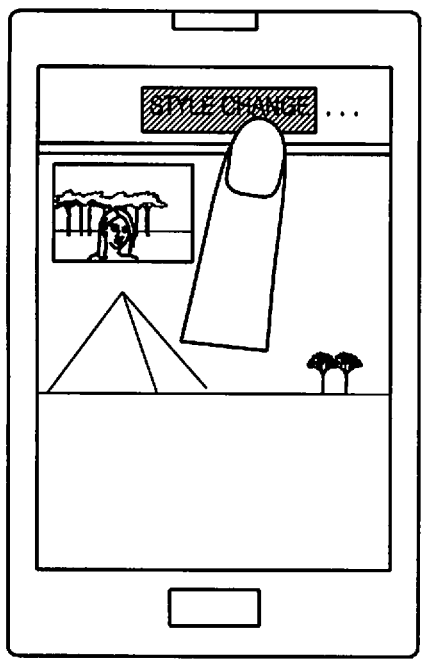
FIGS. 2A to 2C illustrate screenshots of a process of changing a style of a front image on a dual image according to one embodiment of the present invention.
Figure 2B:
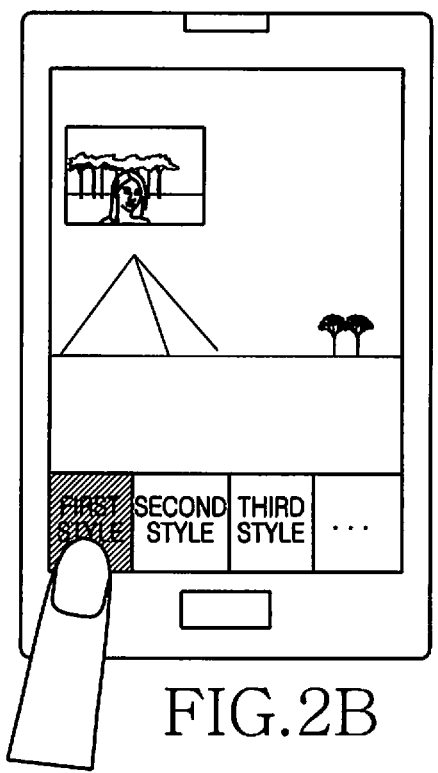
Figure 2C:
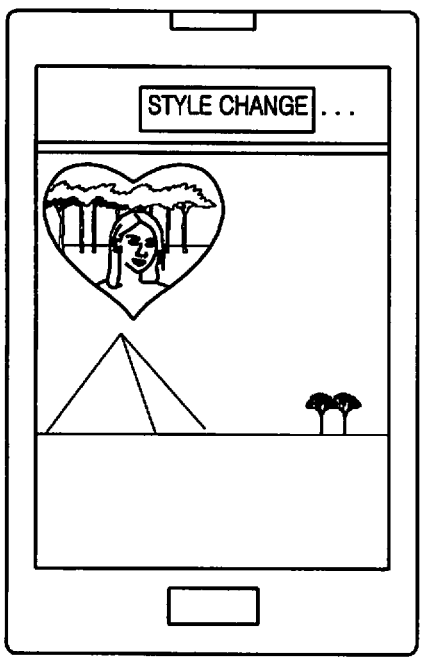

FIGS. 2A to 2C illustrate a process of changing a style of a front image on a dual image according to an embodiment of the present invention.

Hereinafter, it is assumed that an electronic device simultaneously photographs an object facing its front surface and an object facing its rear surface, or first photographs any one of the object facing the front surface and the object facing the rear surface and then successively photographs the other object within a set time.

As shown in FIG. 2A, the electronic device reads and display sa dual image in which a photographed front image is located on a set space of a photographed rear image and receives an icon called "style change", which is an instruction for instructing the electronic device to change a style of a front image on the displayed dual image. The dual image has the photographed front image located on a set space of the photographed rear image. Alternately, it is obvious that the electronic device may generate a dual image in which the photographed rear image is located on a set space of the photographed front image.

Thereafter, as shown in FIG. 2B, the electronic device displays at least one set style type which may change the style of the front image on a set space of the dual image. Herein, the style type may be defined as a set type which may change the style of the front image included in the dual image.

The electronic device receives the selection of any one of at least the one displayed set style type. For example, a first style shown in FIG. 2B is a style type for changing a shape of a front image to a heart shape, the second style shown in FIG. 2B is a style type for changing the shape of the front image to a cloudy shape, and the third style shown in FIG. 2B is a style type for changing the shape of the front image to a sunlit shape. In this case, the electronic device may receive the selection of the first style type for changing the shape of the front image included in the dual image to the heart shape.

As shown in FIG. 2C, the electronic device changes the shape of the front image included in the dual image to the selected first style type. For example, the electronic device may receive the selection of the first style type and change the style of the front image to the selected heart shape.

Herein, the electronic device may read and store a coordinate value of the front image included in the dual image as soon as it changes the shape of the front image included in the dual image to the selected style type. Thereafter, the electronic device may verify the coordinate value of the front image, which is previously stored, when changing the shape of the front image included in the dual image to the selected style type, and then change the shape of the front image such that the position of the front image included in the dual image is not changed.

In a conventional electronic device having a dual camera function there is a disadvantage whereby the electronic device may not change a style type of a front image included in a stored dual image by not storing the front image and a rear image, and storing only the dual image.

However, the electronic device according to an embodiment of the present invention may store the front image and the rear image, respectively, as well as the dual image, receive the selection of any one of at least one set style type when changing the style type of the front image, and change the shape of the front image to the selected style type. Therefore, there is an advantage in that the electronic device according to an embodiment of the present invention may change a style of a front image according to conditions of a stored dual image.

FIGS. 3A to 3D illustrate a process of changing a frame position of a front image according to an embodiment of the present invention.

Hereinafter, it is assumed that an electronic device simultaneously photographs an object facing its front surface and an object facing its rear surface, or first photographs any one of the object facing the front surface and the object facing the rear surface and then successively photographs the other object within a set time.

Figure 3A:
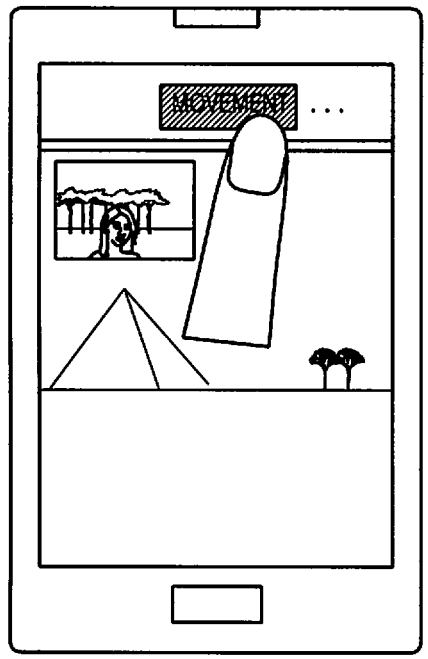
FIGS. 3A to 3D illustrate screenshots of a process of changing a frame position of a front image according to an embodiment of the present invention.

As shown in FIG. 3A, the electronic device reads and displays a dual image in which a photographed front image is located on a set space of a photographed rear image and receives an icon called "movement", which is an instruction for instructing the electronic device to change a frame position of the front image on the displayed dual image. The dual image has the photographed front image is located on a set space of the photographed rear image. Alternately, it is obvious that the electronic device may generate a dual image in which the photographed rear image is located on a set space of the photographed front image. Accordingly, when the dual image is an image in which the photographed rear image is located on the set space of the photographed front image, it is assumed that the electronic device may receive an instruction for instructing the electronic device to change a frame position of the rear image.

Figure 3B:
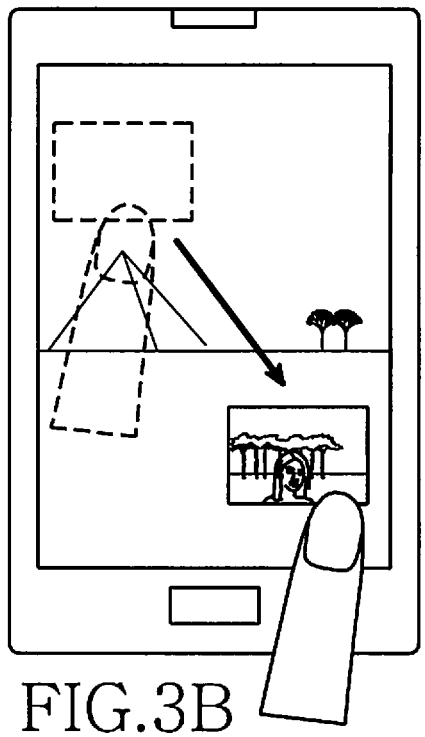

Thereafter, as shown in FIG. 3B, the electronic device receives a touch input of the front image, verifies that the touch input front image is dragged to a specific space, and verifies that the front image is moved to the dragged specific space. In more detail, the electronic device receives a touch input of a certain region of the front image displayed on its touch screen. If it is determined that the front image is dragged to a specific space in a state where touch input of the front image is received, the electronic device moves the front image to the dragged specific space. For example, as shown in FIG. 3B, the electronic device locates the front image on a left upper corner which is a set space. If it is determined that the front image is dragged to a right lower corner in a state where touch input of a certain region of the front image is received, the electronic device moves the front image from the left upper corner to the right lower corner.

Figure 3C:
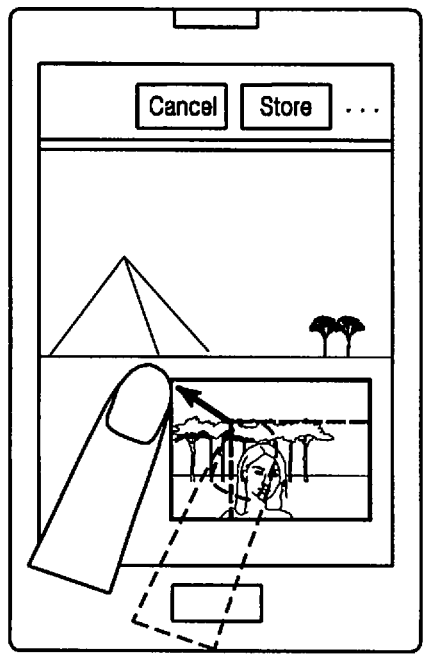
Figure 3D:
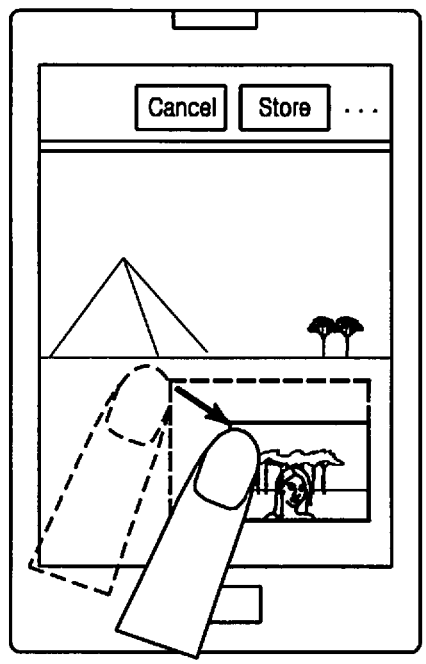

Also, as shown in FIGS. 3C and 3D, the electronic device verifies a touch input of a set portion of the front image which is moved to the specific space, determines a direction in which the touch input front image is dragged, and verifies that the front image is scaled up or down.

For example, as shown in FIG. 3C, if the electronic device verifies that the front image receives a drag touch input of an edge portion of the front image which is located on the right lower corner, it scales up the front image by a dragged size.

Also, as shown in FIG. 3D, if the electronic device verifies that the front image receives a drag touch input of an edge portion of the front image which is located on the right lower corner, it scales down the front image by a dragged size.

In a conventional electronic device having a dual camera function there is a disadvantage whereby the electronic device may not change a frame position of a front image included in a stored dual image by not storing the front image and a rear image, and storing only the dual image.

However, there is an advantage in that the electronic device according to an embodiment of the present invention may scale up or down the changed front image by a size the user wants as well as freely change a frame position of the front image by storing the front image and the rear image, respectively, as well as the dual image.

FIGS. 4A to 4D illustrate a process of generating a dual image by replacing a front image or a rear image according to an embodiment of the present invention.

Hereinafter, it is assumed that an electronic device simultaneously photographs an object facing its front surface and an object facing its rear surface, or first photographs any one of the object facing the front surface and the object facing the rear surface and then successively photographs the other object within a set time. Also, in this case, it is assumed that the electronic device successively photographs four dual images.

As shown in FIG. 4A, the electronic device reads and displays a first dual image in which a photographed first front image is located on a set space of a photographed first rear image. After verifying a touch input of a set space of the first front image included in the displayed first dual image, the electronic device displays at least one stored front image on the set space.

For example, after verifying the touch input of the set space of the first front image included in the displayed first dual image, the electronic device displays a second front image included in a second dual image, a third front image included in a third dual image, and a fourth front image included in a fourth dual image on the set space.

Thereafter, the electronic device verifies the selection of any one of at least the one displayed front image. For example, the electronic device may receive the selection of the fourth front image among the second to fourth front images displayed on the set space.

As shown in FIG. 4B, the electronic device generates a new dual image by changing the first front image included in the first dual image to at least the one selected image. For example, after receiving the selection of the fourth front image, the electronic device generates a new dual image including the fourth front image and a first rear image by changing the first front image included in the first dual image to the fourth front image.

Also, as shown in FIG. 4C, the electronic device reads and displays a first dual image in which a photographed first front image is located on a set space of a photographed first rear image. After verifying a touch input of a set space 401 included in the displayed first dual image, the electronic device displays at least one stored rear image on the set space.

For example, after verifying the touch input of the set space 401 included in the displayed first dual image, the electronic device displays one of a second rear image included in the second dual image, a third rear image included in the third dual image, and a fourth rear image included in the fourth dual image on the set space.

Thereafter, the electronic device verifies the selection of any one of at least the one displayed rear image. For example, the electronic device may receive the selection of the second rear image among the displayed second to fourth images displayed on the set space.

As shown in FIG. 4D, the electronic device generates a new dual image by changing the first rear image included in the first dual image to at least the one selected image. For example, after receiving the selection of the second rear image, the electronic device generates a new dual image including the first front image and the second rear image by changing the first rear image included in the first dual image to the second rear image.

In a conventional electronic device having a dual camera function there is a disadvantage whereby the electronic device does not replace a front image or a rear image when a plurality of dual images are stored by not storing the front image and the rear image, and storing only dual images.

However, there is an advantage in that the electronic device according to an embodiment of the present invention stores the front image and the rear image, respectively, as well as the dual image, and allows the user to freely replace the front image or the rear image according to the preference of the user.

FIGS. 5A to 5D illustrate a process of removing a background included in a front image and restoring a part of the removed image according to an embodiment of the present invention.

Hereinafter, it is assumed that an electronic device simultaneously photographs an object facing its front surface and an object facing its rear surface, or first photographs any one of the object facing the front surface and the object facing the rear surface, and then successively photographs the other object within a set time.

Figure 5A:
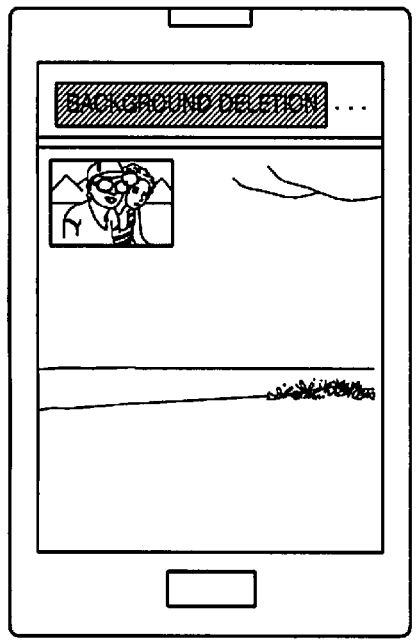
FIGS. 5A to 5D illustrate screenshots of a process of removing a background included in a front image and restoring a part of the removed image according to an embodiment of the present invention.

As shown in FIG. 5A, the electronic device reads and displays a dual image in which a photographed front image is located on a set space of a photographed rear image and receives an icon called "Background Deletion" which is an instruction for instructing the electronic device to delete a background of the front image included in the displayed dual image. For example, as shown in FIG. 5A, the electronic device receives an instruction for instructing the electronic device to delete a background of the front image except for two persons on the photographed front image.

Figure 5B:

Thereafter, as shown in FIG. 5B, the electronic device scales up and displays a front image from which the background is deleted on the front image and receives a "Restore" icon which is an instruction for instructing the electronic device to restore a specific portion on the front image from which the background is deleted. In more detail, after determining that a portion which must not be deleted is deleted and there is a background image the user wants to restore as a result of verifying the front image from which the background is deleted on the front image, the user of the electronic device inputs an instruction for instructing the electronic device to restore a specific portion on the front image from which the background is deleted to the electronic device.

Figure 5C:
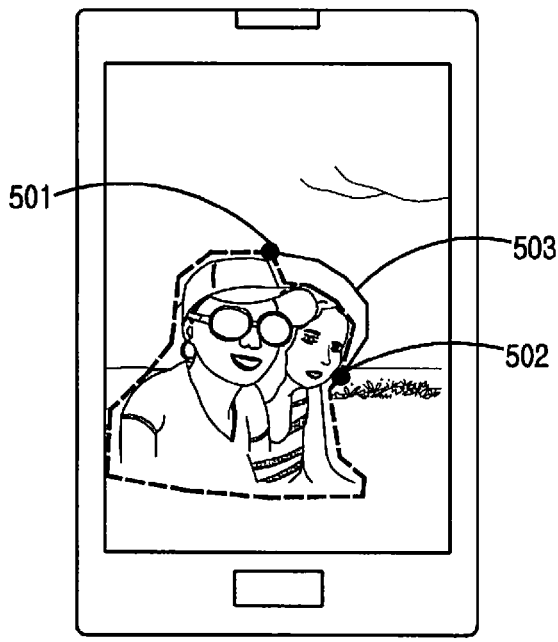

As shown in FIG. 5C, after receiving a touch input of a first external portion on the front image from which the background is deleted and verifying that the touch input first external portion is dragged to a second external portion, the electronic device restores the front image from which the background is deleted to a dragged and partitioned space. For example, as shown in FIG. 5C, after receiving the touch input of a first external portion 501 on a head portion of a person on the right side of the front image and verifying that the first external portion 501 is dragged to a second external portion 502, the electronic device restores an image of the deleted head portion of the on the right person to a dragged and partitioned space 503.

Figure 5D:

Thereafter, as shown in FIG. 5D, the electronic device displays a dual image by restoring the deleted image of the head portion of the person on the right to the dragged and partitioned space 503 and including the front image in which the restoration is completed in a set space of a rear image.

In a conventional electronic device having a dual camera function there is a disadvantage whereby the electronic device does not generate a front image from which a background is deleted automatically on a stored dual image and restore the generated image, by not storing a front image and a rear image, and storing only a dual image.

However, there is an advantage in that the electronic device according to an embodiment of the present invention stories the front image and the rear image, respectively, as well as the dual image, automatically generates a front image from which a background is deleted on the dual image, and restores the generated image.

FIGS. 6A to 6D illustrate a process of removing a background included in a front image and deleting a part of the removed image according to an embodiment of the present invention.

Hereinafter, it is assumed that an electronic device simultaneously photographs an object facing its front surface and an object facing its rear surface, or first photographs any one of the object facing the front surface and the object facing the rear surface, and then successively photographs the other object within a set time.

Figure 6A:
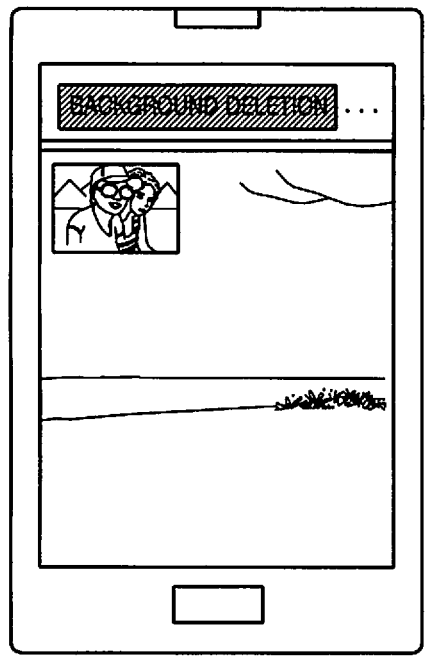
FIGS. 6A to 6D illustrate screenshots of a process of removing a background included in a front image and deleting a part of the removed image according to an embodiment of the present invention.

As shown in FIG. 6A, the electronic device reads and displays a dual image in which a photographed front image is located on a set space of a photographed rear image and receives an icon called "Background Deletion" which is an instruction for instructing the electronic device to delete a background of the front image included in the displayed dual image. For example, as shown in FIG. 6A, the electronic device receives an instruction for instructing the electronic device to delete a background of the front image except for two persons on the photographed front image.

Figure 6B:

Thereafter, as shown in FIG. 6B, the electronic device scales up and displays a front image from which the background is deleted on the front image and receive a "Delete" icon which is an instruction for instructing the electronic device to delete a specific portion on the front image from which the background is deleted. In more detail, after determining that there is an image portion to be additionally deleted as a result of verifying the front image from which the background is deleted on the front image, a user of the electronic device inputs an instruction for instructing the electronic device to delete a specific portion on the front image from which the background is deleted to the electronic device.

Figure 6C:
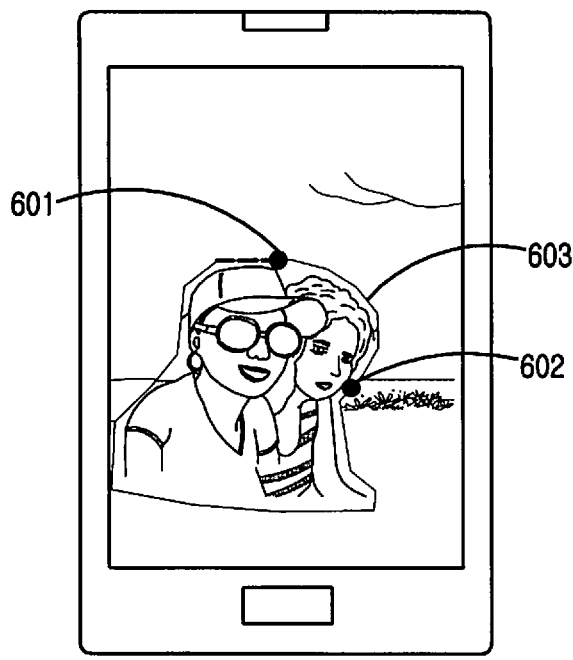

As shown in FIG. 6C, after receiving a touch input of a first external portion on the front image from which the background is deleted and verifying that the first external portion is dragged to a second external portion, the electronic device may delete the front image from which the background is deleted to a dragged and partitioned space. For example, as shown in FIG. 6C, receiving touch input of a first external portion 601 on a head portion of a person on the right side of the front image and verifying that the first external portion 601 is dragged to a second external portion 602, the electronic device may delete an image of the head portion of the person on the right side to a dragged and partitioned space 603.

Figure 6D:
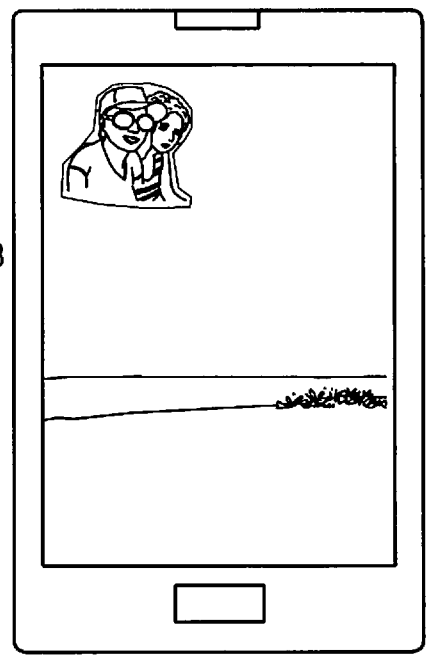

Thereafter, as shown in FIG. 6D, the electronic device displays a dual image by deleting the image of the head portion of the right person to the dragged and partitioned space 603 and including the front image in which the deletion is completed in a set space of a rear image.

In a conventional electronic device having a dual camera function there is a disadvantage whereby the electronic device does not generate a front image from which a background is deleted automatically on a stored dual image and additionally delete an image from the generated image by not storing a front image and a rear image, and storing only a dual image.

However, there is an advantage in that the electronic device according to an embodiment of the present invention stores the front image and the rear image, respectively, as well as the dual image, automatically generating a front image from which a background is deleted on the dual image, and additionally deleting a specific portion on the generated image.

Figure 7A:
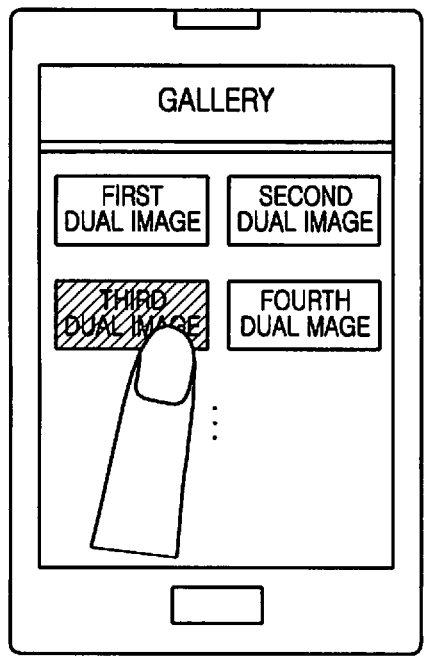
FIGS. 7A to 7C illustrate screenshots of a process of displaying dual images on a gallery which stores images stored in an electronic device according to an embodiment of the present invention.
Figure 7B:
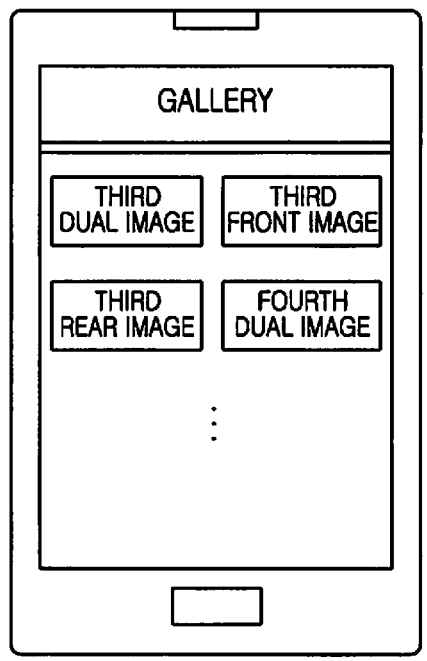
Figure 7C:
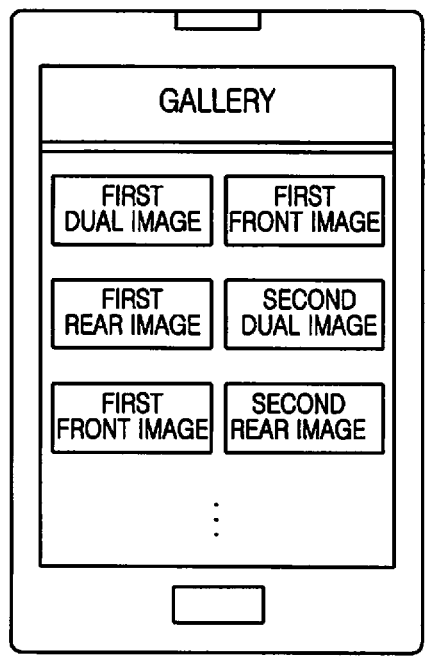

FIGS. 7A to 7C illustrate a process of displaying dual images on a gallery which stores images stored in an electronic device according to an embodiment of the present invention.

Hereinafter, it is assumed that an electronic device simultaneously photographs an object facing its front surface and an object facing its rear surface, or first photographs any one of the object facing the front surface and the object facing the rear surface and then successively photographs the other object within a set time.

As shown in FIG. 7A, when the electronic device is set not to display a front image and a rear image separately when displaying a dual image stored therein, it may display a dual image on a gallery which stores photographed images. In more detail, the electronic device may store dual images, front images, and rear images, respectively, and display only the dual images on the gallery which stores images thereof.

For example, as shown in FIG. 7A, the electronic device displays only dual images, such a first dual image, a second dual image, a third dual image, and a fourth dual image, on a storage such as a gallery which stores photographed images. That is, a user of the electronic device who does not want to display a plurality of images on a touch screen of the electronic device may set, as described above, the electronic device to display only dual images.

Thereafter, as shown in FIGS. 7A and 7B, after receiving the selection of a specific dual image displayed on the touch screen, the electronic device displays a front image and a rear image, included in the selected dual image, together. For example, as shown in FIG. 7A, after receiving the selection of the third dual image displayed on the touch screen, the electronic device displays a third front image and a third rear image included in the selected third dual image together with the third dual image, as shown in FIG. 7B.

However, as shown in FIG. 7C, when the electronic device is set to display a front image and a rear image separately when displaying a dual image stored therein, it displays the front image and the rear image separately together with the dual image on a gallery which stores photographed images. As shown in FIG. 7C, the electronic device displays a first front image and a first rear image separately together with the first dual image. Also, the electronic device may display a second front image and a second rear image separately together with the second dual image.

Figure 8:
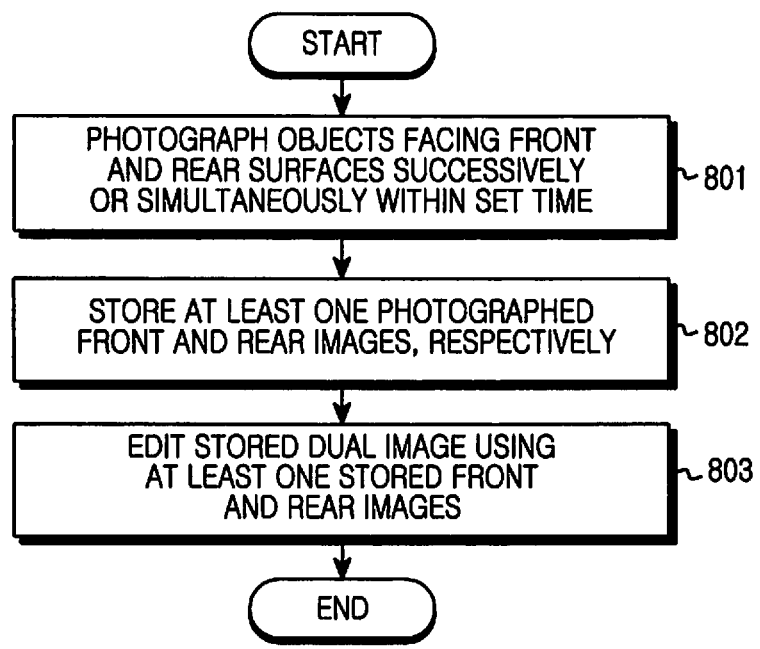
FIG. 8 is a flowchart illustrating an operation process of an electronic device according to an embodiment of the present invention.

FIG. 8 is a flowchart illustrating an operation process of an electronic device according to an embodiment of the present invention.

As shown in FIG. 8, the electronic device photographs an object facing its front or rear surface successively or simultaneously within a set time at step 801. In more detail, the electronic device simultaneously photographs the object facing the front surface and the object facing the rear surface. Alternately, the electronic device first photographs any one of the object facing the front surface and the object facing the rear surface and then successively photographs the other object within a set time.

Thereafter, the electronic device store at least the one photographed front and rear images, respectively, at step 802. In more detail, the electronic device generates a dual image in which the photographed front image is located on a set space of the photographed rear image, and simultaneously stores a generated front image and a generated rear image, respectively. For example, the object which is located at the front surface of the electronic device is a person with the beach in the background, and the object which is located at the rear surface of the electronic device has the beach in the background. In this case, the electronic device generates a dual image by locating a front image of a person with the beach in the background on a set space of a rear image with the beach in the background. Also, the electronic device stores the rear image with the beach in the background and the front image of the person with the beach in the background, respectively.

Thereafter, the electronic device edits a stored dual image using at least the one stored front and rear images at step 803. The electronic device may change a style to various styles without limiting a style of the stored dual image. Also, the electronic device may change a position of a frame of the front image. Also, the electronic device may generate a new dual image by replacing only a certain background of a rear or front surface. Also, the electronic device may remove only a certain background of a front image included in the stored dual image.

Figure 9A:
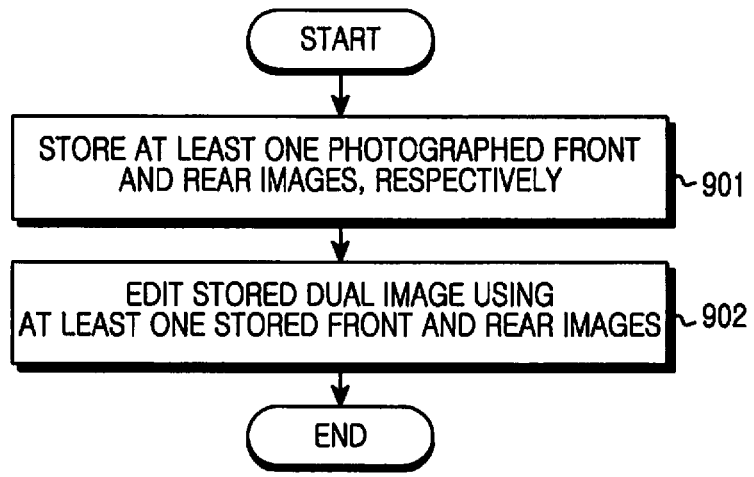
FIG. 9A is a flowchart illustrating a process of editing a dual image in an electronic device according to an embodiment of the present invention.

FIG. 9A is a flowchart illustrating a process of editing a dual image in an electronic device according to an embodiment of the present invention.

As shown in FIG. 9A, the electronic device stores at least one photographed front and rear images, respectively at step

901. In more detail, the electronic device generates a dual image in which the photographed front image is located on a set space of the photographed rear image, and simultaneously stores a generated front image and a generated rear image, respectively. For example, an object which is located at a front surface of the electronic device is a person with the beach in the background and an object which is located at a rear surface of the electronic device has the beach in the background. The electronic device generates a dual image by locating a front image of the person with the beach in the background on a set space of a rear image with the beach in the background. Also, the electronic device stores the rear image with the beach in the background and the front image of the person with the beach in the background, respectively.

Thereafter, the electronic device edits a stored dual image using at least the one stored front and rear images at step 902. The electronic device may change a style to various styles without limiting a style of the stored dual image. Also, the electronic device may change a position of a frame of the front image. Also, the electronic device may generate a new dual image by replacing only a certain background of a rear or front surface. Also, the electronic device may remove only a certain background of a front image included in the stored dual image.

Figure 9B:
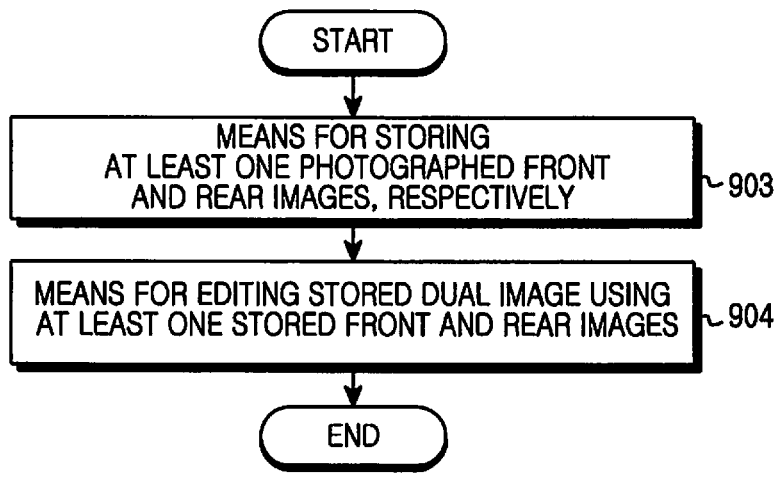
FIG. 9B is a flowchart illustrating configuration of an electronic device for editing a dual image according to an embodiment of the present invention.

FIG. 9B is a flowchart illustrating configuration of an electronic device for editing a dual image according to an embodiment of the present invention.

As shown in FIG. 9B, a memory 903 of the electronic device, that is, a means for storing at least one photographed front and rear images, respectively, is provided. In more detail, the memory of the electronic device generates a dual image in which the photographed front image is located on a set space of the photographed rear image, and simultaneously stores a generated front image and a generated rear image, respectively. For example, an object which is located at a front surface of the electronic device is a person with the beach in the background and an object which is located at a rear surface of the electronic device has the beach in the background. The electronic device generates a dual image by locating a front image of the person with the beach in the background on a set space of a rear image with the beach in the background. Alternately, the memory of the electronic device may store the rear image with the beach in the background and the front image of the person with the beach in the background, respectively.

Thereafter, a processor module 904 of the electronic device, that is, a editing a stored dual image using at least the one stored front and rear images, is provided. The processor module of the electronic device may change a style to various styles without limiting a style of the stored dual image. Also, the processor module of the electronic device may change a position of a frame of the front image. Also, the processor module of the electronic device may generate a new dual image by replacing only a certain background of a rear or front surface. Also, the processor module of the electronic device may remove only a certain background of a front image included in the stored dual image.

Figure 10:
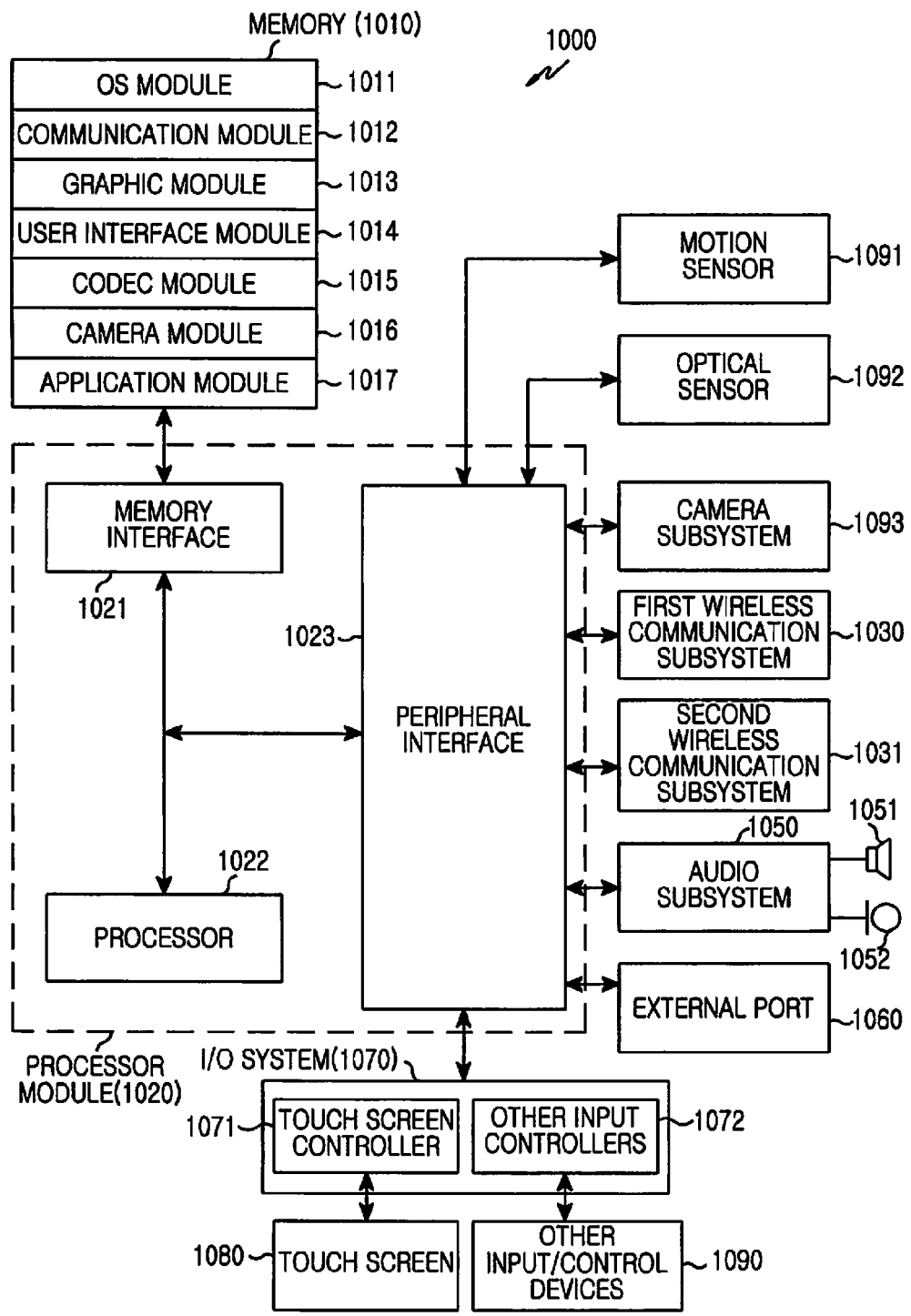
FIG. 10 is a block diagram illustrating configuration of an electronic device according to an embodiment of the present invention.

FIG. 10 is a block diagram illustrating configuration of an electronic device according to an embodiment of the present invention.

This electronic device 1000 may be a portable electronic device, including but not limited to a portable terminal, a mobile phone, a mobile pad, a media player, a tablet computer, a handheld computer, and a Personal Digital Assistant (PDA). Also, the electronic device 1000 may include a device in which two or more functions are combined among these apparatuses.

This electronic device 1000 includes a memory 1010, a processor module 1020, a first wireless communication subsystem 1030, a second wireless communication subsystem 1031, an external port 1060, an audio subsystem 1050, a speaker 1051, a microphone 1052, an Input/Output (I/O) system 1070, a touch screen 1080, other input/control devices 1090, a motion sensor 1091, an optical sensor 1092, and a camera subsystem 1093. The memory 1010 and the external port 1060 may be a plurality of memories and external ports, respectively.

The processor module 1020 may include a memory interface 1021, one or more processors 1022, and a peripheral interface 1023. In some cases, the whole processor module 1020 is referred to as a processor. In accordance with an embodiment of the present invention, the processor module 1020 edits a stored dual image using at least one stored front and rear images. Also, the processor module 1020 receives the selection of any one of at least one displayed set style type and changes a style of a front image to the selected style. Also, the processor module 1020 receives a touch input of a front image, verifies that the touch input front image is dragged to a specific space, and verifies that the front image is moved to a dragged specific space. Also, the processor module 1020 verifies a touch input of a set portion of the front image which is moved to a specific space, determines a direction in which the touch input front image is dragged, and verifies that the front image is scaled up or down. Also, the processor module 1020 verifies touch input of a set space of a first front image included in a displayed first dual image, verifies the selection of a second front image which is one of at least one displayed front image, and generates a second dual image by changing a first front image included in the first dual image to the second front image. Also, the processor module 1020 may verifies a touch input of a set space of a first rear image included in a displayed first dual image, verifies the selection of a second rear image which is one of at least one displayed rear image, and generates a second dual image by changing a first rear image included in the first dual image to the second rear image. Also, the processor module 1020 generates a dual image including a front image from which a background is deleted on a front image. Also, the processor module 1020 verifies that an input instruction is an instruction for instructing the processor module of the electronic device to restore a specific portion on a front image from which a background is deleted, receives a touch input of a first external portion on the front image from which the background is deleted, verifies that the first external portion is dragged to a second external portion, and restores the front image from which the background is deleted to a dragged and partitioned space. Also, the processor module 1020 verifies that an input instruction is an instruction for instructing the processor module of the electronic device to delete a specific portion on a front image from which a background is deleted, receives a touch input of a first external portion on the front image from which the background is deleted, verifies that the first external portion is dragged to a second external portion, and deletes a dragged and partitioned space from the front image from which the background is deleted.

The processor 1022 executes several software programs and performs several functions for the electronic device 1000. Also, the processor 1022 performs process and control for voice communication and data communication. Also, in addition to this normal function, the processor 1022 plays a role in executing a specific software module (instruction set) stored in the memory 1010 and performing several specific functions corresponding to the software module. That is, the processor 1022 interworks with the software modules stored in the memory 1010 and performs the method according to embodiments of the present invention.

The processor 1022 may include one or more data processors, an image processor, or a codec. The processor 1022 may separately include the data processors, the image processor, or the codec. Also, the processor 1022 may include several processors for performing different functions. The peripheral interface 1023 connects the I/O system 1070 of the electronic device 1000 and several peripheral devices to the processor 1022 and the memory 1010 (though the memory interface 1021).

A variety of components of the electronic device 1000 may be coupled by one or more communication buses or stream lines.

The external port 1060 is used to connect a portable electronic device to another electronic device directly or connect it to another electronic device indirectly through a network (e.g., the Internet, an intranet, a wireless Local Area Network (LAN), etc.). For example, the external port 1060 includes, which is not limited to, a Universal Serial Bus (USB) port, a firewire port, etc.

The motion sensor 1091 and the optical sensor 1092 connect to the peripheral interface 1023 and perform several functions. For example, the motion sensor 1091 and the optical sensor 1092 connect to the peripheral interface 1023, sense motion of the electronic device 1000, and sense light from the outside. Furthermore, a position measurement system and other sensors such as a temperature sensor, a biosensor, etc. may connect to the peripheral interface 1023 and may perform related functions.

The camera subsystem 1093 performs a camera function like a photo and video clip recording function.

The optical sensor 1092 may be a Charge Coupled Device (CCD) or a Complementary Metal-Oxide Semiconductor (CMOS) device.

A communication function is performed through the first and second wireless communication subsystems 1030 and 1031. Each of the first and second wireless communication subsystems 1030 and 1031 may include a radio frequency receiver and transceiver and/or a beam (e.g., infrared ray) receiver and transceiver. The first communication subsystem 1030 and the second communication subsystem 1031 may be classified according to a communication network through which the electronic device 1000 communicates. For example, the communication network may be, but is not limited to, a Global System for Mobile communication (GSM) network, an Enhanced Data GSM Environment (EDGE) network, a Code Division Multiple Access (CDMA) network, a W-CDMA network, a Long Term Evolution (LTE) network, an Orthogonal Frequency Division Multiple Access (OFDMA) network, a Wireless Fidelity (Wi-Fi) network, a WiMax network, or/and a Bluetooth network. Each of the first and second communication subsystems 1030 and 1031 may include a communication subsystem designed to be operated through the communication network. The first and second wireless communication subsystems 1030 and 1031 may be combined and configured as one wireless communication subsystem.

The audio subsystem 1050 connects to the speaker 1051 and the microphone 1052 and is responsible for inputting and outputting an audio stream, such as a voice recognition function, a voice copy function, a digital recording function, and a phone call function. That is, the audio subsystem 1050 communicates with a user through the speaker 1051 and the microphone 1052. The audio subsystem 1050 receives a data stream through the peripheral interface 1023 of the processor module 1020 and converts the received data stream into an electric stream. The converted electric stream is transmitted to the speaker 1051. The speaker 1051 converts the electric stream into a sound wave to which people may listen and outputs the converted sound wave. The microphone 1052 converts a sound wave transmitted from people or other sound sources into an electric stream. The audio subsystem 1050 receives the converted electric stream from the microphone 1052. The audio subsystem 1050 converts the received electric stream into an audio data stream and transmits the converted audio data stream to the peripheral interface 1023. The audio subsystem 1050 may include an attachable and detachable earphone, headphone, or headset.

The I/O system 1070 includes a touch screen controller 1071 and/or other input controllers 1072. The touch screen controller 1071 is coupled to the touch screen 1080. The touch screen 1080 and the touch screen controller 1071 may detect contact and motion, or discontinuing contact or motion, using not only capacitive, resistive, infrared ray, and surface acoustic wave technologies for determining one or more contact points with the touch screen 1080 but also a certain multi-touch sensing technology including other proximity sensor arrangements or other elements. The other input controllers 1072 may be coupled to the other input/control devices 1090. The other input/control devices 1090 may be pointer devices such as one or more buttons, a rocker switch, a thumb-wheel, a dial, a stick, and/or a stylus.

The touch screen 1080 provides an input/output interface between the electronic device 1000 and the user. That is, the touch screen 1080 transmits a touch input of the user to the electronic device 1000. Also, the touch screen 1080 is a medium for displaying output from the electronic device 1000 to the user. That is, the touch screen 1080 displays visual output to the user. This visual output has a text type, a graphic type, a video type, and a combination of these types.

The touch screen 1080 may be, but is not limited to, a Liquid Crystal Display (LCD), a Light Emitting Diode (LED), a Light emitting Polymer Display (LPD), an Organic Light Emitting Diode (OLED), an Active Matrix Organic Light Emitting Diode (AMOLED), or a Flexible LED (FLED). The touch screen 1080 according to an embodiment of the present invention reads and displays a stored dual image. After receiving an instruction for instructing a touch screen 1080 to change a style of a front image on the displayed dual image, the touch screen 1080 displays at least one set style type which changes a style of the front image on a set space of the dual image. Also, the touch screen 1080 reads and displays a stored dual image and receives an instruction for instructing it to move a position of a frame of a front image on the displayed dual image. Also, the touch screen 1080 reads and displays a stored dual image and displays at least one stored front image on a set space. Also, the touch screen 1080 reads and displays a stored first dual image and displays at least one stored rear image on a set space. Also, the touch screen 1080 reads and displays a stored dual image and receives an instruction for instructing it to delete a background of a front image included in the displayed dual image. Also, the touch screen 1080 scales up and displays a front image from which a background is deleted on a front image and receives an instruction for editing it to edit the front image from which the background is deleted. Also, the touch screen 1080 scales up and displays a front image from which a background is deleted on a front image and receives an instruction for editing it to edit the front image from which the background is deleted.

The memory 1010 is coupled to the memory interface 1021. The memory 1010 may include a high-speed Random Access Memory (RAM) such as one or more magnetic storages, a non-volatile memory, one or more optical storages, and/or a flash memory (e.g., a NAND flash memory or a NOR flash memory).

The memory 1010 stores software components. The software components include an Operating System (OS) module 1011, a communication module 1012, a graphic module 1013, a user interface module 1014, a CODEC module 1015, a camera module 1016, one or more application modules 1017, etc. Also, the modules which are the software components may be expressed in a set of instructions. Accordingly, the modules are expressed in an instruction set. Also, the modules are expressed in programs.

The OS module 1011 (e.g., embedded OS such as Windows, Linux, Darwin, RTXC, UNIX, OS X, or VxWorks) includes several software components for controlling a general system operation. For example, control of this general system operation includes memory management and control, storage hardware (device) control and management, power control and management, etc. The OS module 1011 also performs a function for smoothly communicating between several hardware components (devices) and software components (modules). When there is a difference of a set picture vector value or more and it is verified that a picture vector value is held within a set picture vector value range, the memory 1010 according to an embodiment of the present invention may register a sound source file portion corresponding to a time when a reference picture vector value is extracted as a highlight estimation interval. The memory 1010 according to an embodiment of the present invention may store at least one photographed front and rear images, respectively. The camera module 1016 according to an embodiment of the present invention may photograph objects facing front and rear surfaces successively and simultaneously within a set time.

The communication module 1012 communicates with other electronic devices such as a computer, a server, and/or a portable terminal through the first and second wireless communication subsystems 1030 and 1031 or the external port 1060. When a second screen is an application which may request transmission of a call and an object of a text type includes only numbers, the communication module 1012 according to an embodiment of the present invention may request the transmission of the call to the numbers.

The graphic module 1013 includes several software components for providing and displaying graphics on the touch screen 1080. The term "graphics" means that texts, web pages, icons, digital images, videos, animations, etc., are included.

The user interface module 1014 includes several software components related to a user interface. The user interface module 1014 includes contents about whether a state of a user interface is changed to any state, whether a state of a user interface is changed in any condition, etc.

The CODEC module 1015 may include software components related to encoding and decoding of video files. The CODEC module 1015 may include a video stream module such as an MPEG module and/or an H204 module. Also, the CODEC module 1015 may include a code module for several audio files such as AAA files, AMR files, and WMA files. Also, the CODEC module 1015 includes an instruction set corresponding to an embodiment of the present invention.

The camera module 1016 includes cameral-related software components capable of performing camera-related processes and functions.

The application module 1017 includes a browser function, an email function, an instant message function, a word processing function, a keyboard emulation function, an address book function, a touch list function, a widget function, a Digital Rights Management (DRM) function, a voice recognition function, a voice copy function, a position determining function, a location based service function, etc.

A variety of functions of the electronic device 1000, which are described above or to be described later, may be executed by one or more streaming processing, hardware including an Application Specific Integrated Circuit (ASIC), software, and/or combination of them.

Figure 11:
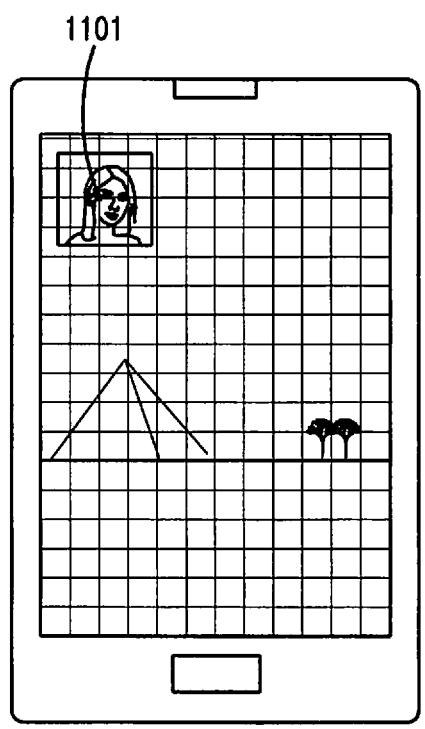
FIG. 11 illustrates a screenshot showing information provided when editing a dual image according to an embodiment of the present invention.

FIG. 11 illustrates information provided when editing a dual image according to an embodiment of the present invention.

As shown in FIG. 11, in order to store a front image, a rear image, and a front and rear image, an electronic device according to an embodiment of the present invention stores a center coordinate 1101 and a size on a coordinate plane of initial front and rear images together. In more detail, the electronic device may set a certain coordinate plane and store the center coordinate 1101 and the size of the front and rear images together with the front image, the rear image, and the front and rear image.

Thereafter, the electronic device reedits a stored dual image at least once, using the stored center coordinate 1101 and size of the front and rear images. In more detail, although a stored dual image is edited, the electronic device reedits the edited dual image at least once, using the center coordinate 1101 and size of the front and rear images, which is stored together with the initial front and rear images.

For example, when the electronic device changes a style of the front image, only the style of the front image may be changed to be identical to a position and size of a front image before being changed because the position and size of the front image before being changed is stored in a coordinate plane.

Also, in order to verify that the front image is dragged and moved to a specific space, the electronic device repeatedly performs a reediting process of moving an initial front image to another space after verifying that the front image is moved because a center coordinate and size on a coordinate plane of a front image before being moved is stored.

Also, in order to verify that the front image is scaled up or down, the electronic device repeatedly performs a reediting process of scaling up or down an initial front image to another size after verifying that the front image is scaled up or down because a center coordinate and size on a coordinate plane of a front image before being moved is stored.

Also, in order to verify that a second dual image is generated by changing a first front image included in a first dual image to a second front image, the electronic device changes the first front image to the second front image to be identical to a position and size of the first front image when the first image is changed to the second front image because a center coordinate and size on a coordinate plane of a first front image before being changed to the second front image is stored.

Also, the electronic device changes a rear image to a new rear image to be identical to a position and size of the rear image before being changed when changing the rear image.

Also, in order to verify that a background of the front image is deleted, the electronic device performs another reediting process again, using the front image before being deleted because a center coordinate and size on a coordinate plane of the front image before the background is deleted is stored.

As described above, the electronic device may store a center coordinate and size of front and rear images. Also, the electronic device may store a specific coordinate (left upper and lower ends or right upper and lower ends) of front and rear images. The electronic device may store a center coordinate and a size together when storing initial front and rear front images. The electronic device may store a center coordinate and a size when the editing of a dual image is started.

While the present invention has been particularly shown and described with reference to certain embodiments thereof, it will be understood by those skilled in the art that various changes in form and details may be made therein without departing from the spirit and scope of the present invention as defined by the appended claims.

What is claimed is:

1. An operation method in an electronic device having a dual camera, the operation method comprising:
    photographing a front image;
    photographing a rear image;
    generating a dual image using the front image and the rear image;
    storing the dual image, the front image and the rear image;
    editing the stored dual image using the front image and the rear image;
    determining a center coordinate and a size on a coordinate plane of each of the front image and the rear image in the edited dual image; and
    reediting the stored dual image at least once, using the determined center coordinate and size on the coordinate plane of the front image and the rear image.

2. The method of claim 1, wherein the photographing comprises successively or simultaneously photographing objects facing front and rear surfaces of the electronic device within a set time.

3. The method of claim 1, wherein editing the stored dual image comprises:
    reading and displaying the stored dual image;
    receiving an instruction for instructing the electronic device to change a style of a front image on the displayed dual image;
    displaying at least one set style type for changing the style of the front image on a set space of the dual image; and
    receiving a selection of any one of at least the one displayed set style type and changing the style of the front image to the selected style.

4. The method of claim 1, wherein editing the stored dual image comprises:
    reading and displaying the stored dual image;
    receiving an instruction for instructing the electronic device to change a position of a frame of a front image on the displayed dual image;
    receiving a touch input of the front image and verifying that the touch input front image is dragged to a specific space; and
    verifying that the front image is moved to the dragged specific space.

5. The method of claim 4, further comprising:
    verifying a touch input of a set portion of the front image moved to the specific space; and
    determining a direction in which the touch input front image is dragged and verifying that the front image is scaled up or down.

6. The method of claim 1, wherein editing the stored dual image comprises:
    reading and displaying a stored first dual image;
    verifying a touch input of a set space of a first front image included in the displayed first dual image;
    displaying at least the one stored front image on the set space;
    verifying selection of a second front image which is any one of at least the one displayed front image; and
    generating a second dual image by changing the first front image included in the first dual image to the selected second front image.

7. The method of claim 1, wherein editing the stored dual image comprises:
    reading and displaying a stored first dual image;
    verifying a touch input of a set space of a first rear image included in the displayed first dual image;
    displaying at least the one stored rear image on the set space;
    verifying selection of a second rear image which is any one of at least the one displayed rear image; and
    generating a second dual image by changing the first rear image included in the first dual image to the selected second rear image.

8. The method of claim 1, wherein editing the stored dual image comprises:
    reading and displaying the stored dual image;
    receiving an instruction for instructing the electronic device to delete a background of a front image included in the displayed dual image; and
    generating a dual image including a front image from which the background is deleted on the front image.

9. The method of claim 8, further comprising:
    scaling up and displaying the front image from which the background is deleted on the front image;
    receiving an instruction for the electronic device to edit the front image from the background is deleted;
    verifying that the received instruction is an instruction for the electronic device to restore a specific portion on the front image from which the background is deleted;
    receiving a touch input of a first external portion on the front image from which the background is deleted and verifying that the first external portion is dragged to a second external portion; and
    restoring the front image from which the background is deleted to a dragged and partitioned space.

10. The method of claim 8, further comprising:
    scaling up and displaying the front image from which the background is deleted on the front image;
    receiving an instruction for the electronic device to edit the front image from which the background is deleted;
    verifying that the received instruction is an instruction for the electronic device to delete a specific portion on the front image from which the background is deleted;
    receiving a touch input of a first external portion on the front image from which the background is deleted and verifying that the first external portion is dragged to a second external portion; and
    deleting a dragged and partitioned space from the front image from which the background is deleted.

11. The method of claim 1, wherein the generating the dual image comprises generating the dual image by synthesizing the front image and the rear image.

12. An electronic device having a dual camera, the electronic device comprising:
    a camera module for photographing a front image and photographing a rear image;
    a memory for storing the front image and rear image; and
    a processor module for generating a dual image using the front image and the rear image, editing a stored dual image using at least the front image and the rear image, and determining a center coordinate and a size on a coordinate plane of each of the front image and the rear image in the edited dual image, and reediting the stored dual image at least once, using the determined center coordinate and size on the coordinate plane of the front image and the rear image.

13. The electronic device of claim 12, further comprising the camera module for successively or simultaneously photographing objects facing front and rear surfaces of the electronic device within a set time.

14. The electronic device of claim 12, further comprising a touch screen for reading and displaying the stored dual image, receiving an instruction for the electronic device to change a style of a front image on the displayed dual image, and displaying at least one set style type for changing the style of the front image on a set space of the dual image, wherein the processor module receives selection of any one of at least the one displayed set style type and changes the style of the front image to the selected style.

15. The electronic device of claim 12, further comprising a touch screen for reading and displaying the stored dual image and receiving an instruction for the electronic device to change a position of a frame of a front image on the displayed dual image, wherein the processor module receives a touch input of the front image, verifies that the touch input front image is dragged to a specific space, and verifies that the front image is moved to the dragged specific space.

16. The electronic device of claim 15, wherein the processor module verifies a touch input of a set portion of the front image is moved to the specific space, determines a direction in which the touch input front image is dragged, and verifies that the front image is scaled up or down.

17. The electronic device of claim 12, further comprising a touch screen for reading and displaying a stored first dual image and displaying at least the one stored front image on a set space, wherein the processor module verifies a touch input of the set space of a first front image included in the displayed first dual image, verifies selection of a second front image which is any one of at least the one displayed front image, and generates a second dual image by changing the first front image included in the first dual image to the selected second front image.

18. The electronic device of claim 12, further comprising a touch screen for reading and displaying a stored first dual image and displaying at least the one stored rear image on a set space, wherein the processor module verifies a touch input of the set space of a first rear image included in the displayed first dual image, verifies selection of a second rear image which is any one of at least the one displayed rear image, and generates a second dual image by changing the first rear image included in the first dual image to the selected second rear image.

19. The electronic device of claim 12, further comprising a touch screen for reading and displaying the stored dual image and receiving an instruction for the electronic device to delete a background of a front image included in the displayed dual image, wherein the processor module generates a dual image including a front image from which the background is deleted on the front image.

20. The electronic device of claim 19, wherein the touch screen scales up and displays the front image from which the background is deleted on the front image and receives an instruction for the electronic device to edit the front image from the background is deleted, and wherein the processor module verifies that the received instruction is an instruction for the electronic device to restore a specific portion on the front image from which the background is deleted, receives a touch input of a first external portion on the front image from which the background is deleted, verifies that the first external portion is dragged to a second external portion, and restores the front image from which the background is deleted to a dragged and partitioned space.

21. The electronic device of claim 19, wherein the touch screen scales up and displays the front image from which the background is deleted on the front image and receives an instruction for the electronic device to edit the front image from the background is deleted, and wherein the processor module verifies that the received instruction is for the electronic device to delete a specific portion on the front image from which the background is deleted, receives a touch input of a first external portion on the front image from which the background is deleted, verifies that the first external portion is dragged to a second external portion, and deletes a dragged and partitioned space from the front image from which the background is deleted.

22. The electronic device of claim 12, wherein the processor module generates the dual image by synthesizing the front image and the rear image.

\* \* \* \* \*